United States Patent [19]

Brown

[11] 4,447,701
[45] May 8, 1984

[54] SLAG CAPTURE AND REMOVAL DURING LASER CUTTING

[75] Inventor: Clyde O. Brown, Newington, Conn.

[73] Assignee: The United States of America as represented by the United States Department of Energy, Washington, D.C.

[21] Appl. No.: 343,609

[22] Filed: Jan. 28, 1982

[51] Int. Cl.³ .............................................. B23K 27/00
[52] U.S. Cl. ........................ 219/121 LG; 219/121 FS; 219/121 LN
[58] Field of Search ................ 219/121 LG, 121 LN, 219/121 LE, 121 LF, 121 LJ, 121 LH, 121 FS, 69 D, 137 R; 252/627, 647

[56] References Cited

U.S. PATENT DOCUMENTS

| | | | |
|---|---|---|---|
| 3,742,183 | 6/1973 | Castro et al. | 219/121 LG X |
| 4,000,391 | 12/1976 | Yeo | 219/121 LG |
| 4,017,708 | 4/1977 | Engel et al. | 219/121 FS X |
| 4,387,286 | 6/1983 | Inoue | 219/69 D |

Primary Examiner—C. L. Albritton
Attorney, Agent, or Firm—Edwin D. Grant; Stephen D. Hamel; Michael F. Esposito

[57] ABSTRACT

Molten metal removed from a workpiece in a laser cutting operation is blown away from the cutting point by a gas jet and collected on an electromagnet.

5 Claims, 1 Drawing Figure

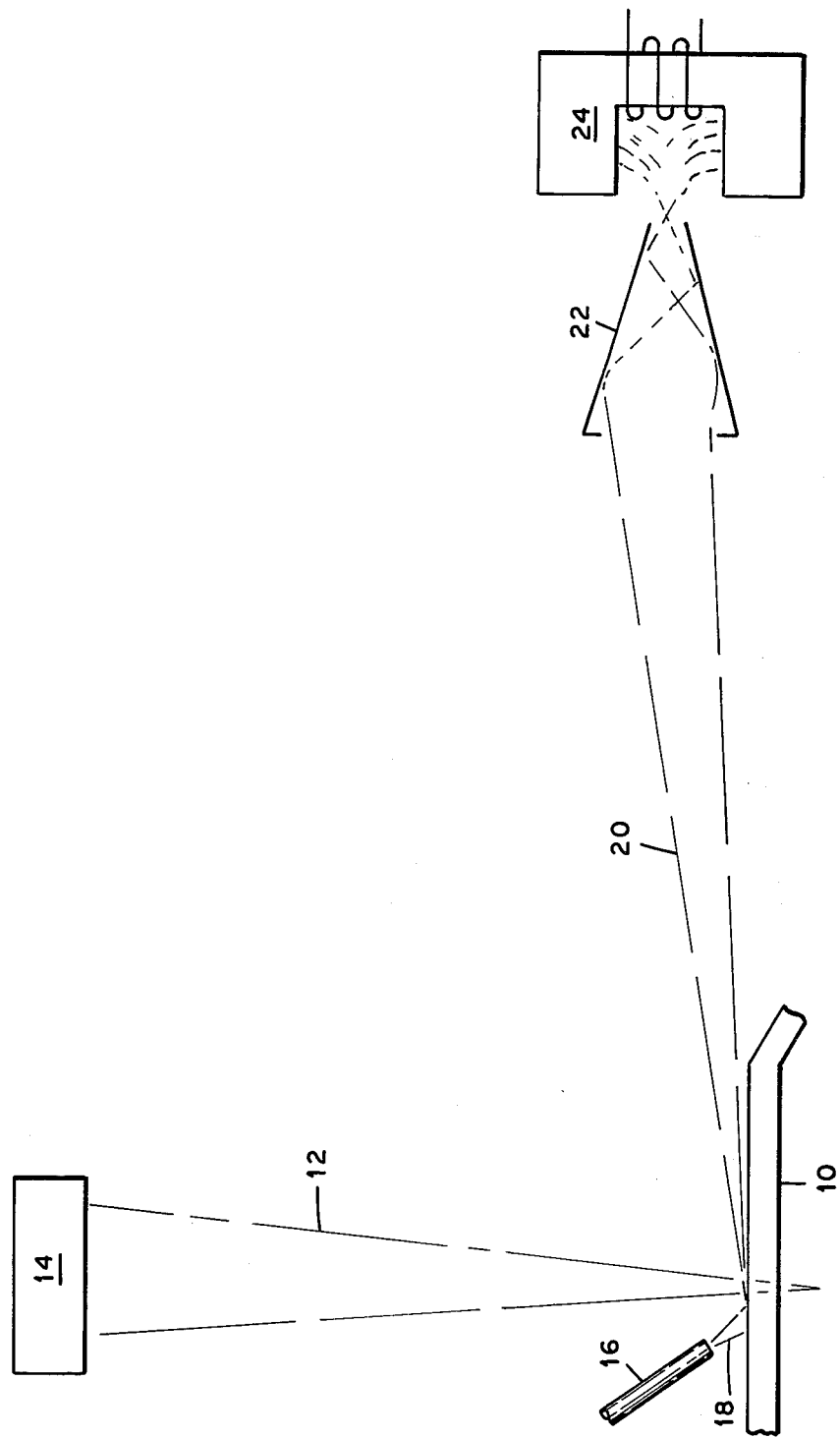

SLAG CAPTURE AND REMOVAL DURING LASER CUTTING

BACKGROUND OF THE INVENTION

This invention resulted from a contract with the U.S. Department of Energy and relates to an apparatus and a method for collecting slag generated in a laser cutting operation.

It has been found expedient to separate the casings of spent nuclear reactor fuel rods from the fuel-containing elements held therein by cutting the casings with a laser beam. Metal melted by the laser beam has heretofore been removed from the cutting point on a fuel rod casing by means of a gas jet which sweeps the melted metal into a suction duct located adjacent the cutting point. The suction ducts required in this type of slag removal system are undesirably bulky, and it would also be advantageous to eliminate the cost of operating the blower associated therewith.

SUMMARY OF THE INVENTION

It is therefore an object of this invention to provide an improved means for collecting slag generated by laser cutting of nuclear reactor fuel rod casings.

Another object is to provide a compact and economically operated slag collection means for a nuclear fuel rod cutting apparatus of the laser type.

These objects are attained by (1) directing a gas jet toward a point on a nuclear fuel rod casing, thereby blowing particles of melted metal, or slag, away from the cutting point, and (2) capturing the thus propelled slag on a magnet.

DESCRIPTION OF THE DRAWING

The drawing is a diagrammatic representation of a preferred embodiment of the invention.

DETAILED DESCRIPTION OF THE PREFERRED EMBODIMENT

In the drawing, reference number 10 designates a workpiece such as the casing of a nuclear fuel rod. A laser beam 12 is directed against workpiece 10 by means of a conventional laser mirror 14 to cut it in accordance with known technology, and a gas jet 16 is aligned adjacent the workpiece so that a high velocity gas stream 18 discharged therefrom blows molten metal particles sputtering from the cut in the workpiece along a divergent path 20. A frustum slag guide tube 22 intercepts the jet-propelled particles and deflects them onto an electromagnet 24, the particles being cooled by spattering on the guide tube.

OPERATION OF THE PREFERRED EMBODIMENT

The applicant has discovered that when the normally nonmagnetic metal (a 300 series austinetic stainless steel) used in nuclear fuel assembly is cut by using a laser beam, the material is melted and then rapidly quenched so that a ferritic and probably a martensitic slag is formed. Therefore the slag becomes ferromagnetic below its Curie temperature.

Thus slag particles removed from a workpiece 10 that is part of a nuclear fuel assembly made of a normally nonmagnetic stainless steel will be retained on electromagnet 24 after being directed thereto by the gas jet discharged from gas jet 16. After a cut in workpiece 10 has been made, captured slag can be released from the electromagnet by de-energizing it. In some cases the electromagnet can advantageously be moved to a dump region remote from workpiece 10 before slag is released therefrom.

Slag guide tube 22 and electromagnet 24 occupy considerably less space than the ductwork included in the suction-type slag collectors now used with laser cutting systems. Furthermore, electromagnet 24 costs less to operate than a blower of a suction-type slag collector.

What is claimed is:

1. A method for cutting a austinetic stainless steel workpiece and collecting slag resulting therefrom, comprising:
   directing a laser beam onto said workpiece to thereby melt metal therefrom and form magnetized slag by transforming the austinetic stainless steel to a martinsitic steel slag;
   directing a gas stream toward the area of said workpiece which is thus being melted to thereby blow said slag away from said area along a path; and
   collecting said slag on a magnet located on said path.

2. The method of claim 1 wherein said workpiece is a component of a nuclear fuel assembly.

3. Apparatus for cutting a austinetic stainless steel workpiece and collecting slag resulting therefrom, comprising:
   means for directing a laser beam onto said workpiece to thereby melt metal therefrom and form magnetized slag by transforming the austinetic stainless steel to a martinsitic steel slag;
   means for directing a gas stream toward the area of said workpiece which is thus being melted to thereby blow said slag away from said area along a path; and
   a magnet located on said path for collecting said slag.

4. The apparatus of claim 3 wherein said workpiece is a component of a nuclear fuel assembly.

5. The apparatus of claim 3 including a tube located on said path between said workpiece and said magnet for guiding said slag toward said magnet.

* * * * *